United States Patent
Mitchem et al.

(10) Patent No.: US 7,382,736 B2
(45) Date of Patent: *Jun. 3, 2008

(54) METHOD FOR SCORING QUEUED FRAMES FOR SELECTIVE TRANSMISSION THROUGH A SWITCH

(75) Inventors: W. Jeffrey Mitchem, Westminster, CO (US); Michael E. O'Donnell, Westminster, CO (US)

(73) Assignee: McData Corporation, Broomfield, CO (US)

( * ) Notice: Subject to any disclaimer, the term of this patent is extended or adjusted under 35 U.S.C. 154(b) by 958 days.

This patent is subject to a terminal disclaimer.

(21) Appl. No.: 10/613,627

(22) Filed: Jul. 2, 2003

(65) Prior Publication Data

US 2004/0028056 A1 Feb. 12, 2004

Related U.S. Application Data

(63) Continuation-in-part of application No. 09/728,452, filed on Nov. 30, 2000, now Pat. No. 6,608,819, which is a continuation-in-part of application No. 09/228,678, filed on Jan. 12, 1999, now Pat. No. 6,233,236.

(51) Int. Cl.
*H04L 12/56* (2006.01)
*H04L 12/66* (2006.01)

(52) U.S. Cl. .............. 370/253; 370/389; 370/392; 370/395.1; 370/412

(58) Field of Classification Search ........... 370/232, 370/253, 352–356, 389, 392, 395.21, 412, 370/468, 466, 359; 711/100, 132, 166; 359/128, 359/352
See application file for complete search history.

(56) References Cited

U.S. PATENT DOCUMENTS

| | | | |
|---|---|---|---|
| 4,817,080 A | 3/1989 | Sohn | |
| 4,975,906 A | 12/1990 | Takiyasu et al. | |
| 5,077,763 A | 12/1991 | Gagnoud et al. | |
| 5,206,888 A | 4/1993 | Hiraguchi et al. | |
| 5,253,251 A | 10/1993 | Aramaki | |

(Continued)

FOREIGN PATENT DOCUMENTS

EP 0 838 922 4/1998

(Continued)

OTHER PUBLICATIONS

Brocade Silkworm switches (with Stitch ASIC) (sold by Brocade Communications Systems since early 1977). [Not Literature].

(Continued)

*Primary Examiner*—Afsar Qureshi
(74) *Attorney, Agent, or Firm*—Hensley Kim & Holzer, LLC

(57) ABSTRACT

A method for selective transmission of through a switch according to a quality of service level includes providing one or more switches in a fibre channel fabric, particularly one or more fibre channel switches. The method includes assigning an initial score to the content of the one or more frames of data. The initial score may be adjusted by one or more alternative score components to determine one or more adjusted scores. The adjusted scores are compared. The method also provides for selecting frames having the highest adjusted scores and transmitting through the switches the frames having the highest adjusted scores.

23 Claims, 3 Drawing Sheets

U.S. PATENT DOCUMENTS

| | | | |
|---|---|---|---|
| 5,365,514 | A | 11/1994 | Hershey et al. |
| 5,390,188 | A | 2/1995 | Dawson |
| 5,400,087 | A | 3/1995 | Uramoto et al. |
| 5,428,616 | A * | 6/1995 | Field et al. .................. 370/253 |
| 5,519,695 | A | 5/1996 | Purohit et al. |
| 5,535,197 | A | 7/1996 | Cotton |
| 5,548,590 | A | 8/1996 | Grant et al. |
| 5,550,816 | A | 8/1996 | Hardwick et al. |
| 5,561,662 | A | 10/1996 | Kakuma et al. |
| 5,563,526 | A | 10/1996 | Hastings et al. |
| 5,581,228 | A | 12/1996 | Cadieux et al. |
| 5,610,745 | A | 3/1997 | Benett |
| 5,732,041 | A | 3/1998 | Joffe |
| 5,757,795 | A | 5/1998 | Schnell |
| 5,761,191 | A | 6/1998 | VanDervort et al. |
| 5,802,054 | A | 9/1998 | Bellenger |
| 5,841,773 | A | 11/1998 | Jones |
| 5,859,835 | A | 1/1999 | Varma et al. |
| 5,894,481 | A | 4/1999 | Book |
| 5,909,686 | A | 6/1999 | Muller et al. |
| 5,912,889 | A | 6/1999 | Preas et al. |
| 5,926,625 | A | 7/1999 | Corlett et al. |
| 5,938,749 | A | 8/1999 | Rusu et al. |
| 5,949,786 | A | 9/1999 | Bellenger |
| 6,044,400 | A | 3/2000 | Golan et al. |
| 6,061,358 | A | 5/2000 | Nelson et al. |
| 6,079,034 | A | 6/2000 | Van Zante et al. |
| 6,138,185 | A | 10/2000 | Nelson et al. |
| 6,148,004 | A | 11/2000 | Nelson et al. |
| 6,157,654 | A | 12/2000 | Davis |
| 6,233,236 | B1 * | 5/2001 | Nelson et al. .............. 370/359 |
| 6,259,695 | B1 | 7/2001 | Ofek |
| 6,345,041 | B1 | 2/2002 | Kimball et al. |
| 6,446,088 | B1 * | 9/2002 | Vaduvur et al. ............ 707/201 |
| 6,608,819 | B1 * | 8/2003 | Mitchem et al. ............ 370/253 |

FOREIGN PATENT DOCUMENTS

| | | |
|---|---|---|
| JP | 60018042 | 1/1985 |
| JP | A-06-037784 | 2/1994 |
| JP | A-06-268685 | 9/1994 |
| JP | 08340353 | 12/1996 |
| WO | 86/02511 | 4/1986 |
| WO | 99/00950 | 1/1999 |

OTHER PUBLICATIONS

Brocade Silkworm switches (with Flannel ASIC) (sold by Brocade Communications Systems since approximately Sep. 1988). [Not Literature].

McDATA ES 2500. [Not Literature].

Cisco Catalyst switches (sold by Cisco since at least mid-1997). [Not Literature].

Madge Visage switches (sold by Madge Networks and its LANNET Subsidiary since at least 1997). [Not Literature].

Bay Networks Baystack 300 series switches (sold by Bay Networks since at least Jul. 1997). [Not Literature].

Bay Networks Armon and Optivity Analysis Software (sold by Bay Networks since at least 1996). [Not Literature].

Extreme Networks Summit switches (sold by Extreme Networks since at least Jul. 1997). [Not Literature].

Gadzoox Networks Gibraltar Fibre Channel Managed Hubs (sold by Gadzoox Networks, Inc. since at Least 1997). [Not Literature].

Gadzoox Networks Denali Fibre Channel Area Switch (sold by Gadzoox Networks since at least 1997). [Not Literature].

Cajun Switches (sold by Lucent Technologies, LANNET, Agile, and/or Prominent Corp. since at least 1997). [Not Literature].

Cajun View Suite (sold by Prominent and/or Lucent since at least Oct. 1988). [Not Literature].

Montage (sold by LANNET and/or Lucent since at least Oct. 1998). [Not Literature].

Ascend B-STDX frame relay/ATM switches; and CBX 500 and GX 550 ATM switches (sold by Lucent and/or Ascend Since at least 1997). [Not Literature].

Ascend Management software (sold by Ascend and/or Lucent since at least Oct. 1998). [Not Literature].

Alteon AceSwitch 100 (sold by Alteon since at least 1996). [Not Literature].

Ipsilon IP Switch ATM 1600 Switch (sold by Ipsilon Networks since at least 1996). [Not Literature].

Intel 510T Switch (sold by Intel Corp. since at least Feb. 1998). [Not Literature].

3 Com SuperStack2 LAN Switch Transcend LANSentry Manager (sold by 3Com Corp. since at least 1997). [Not Literature].

3 Com Transcend LANSentry Manger (sold by 3Com since at least 1997). [Not Literature].

Ancor SANBox-8 Switch (sold by Ancor Communications since at least 1998). [Not Literature].

Ancor GigWorks MKII (sold by Ancor Communications since at least 1997). [Not Literature].

Vixel Switches and SAN Management Software (sold by Vixel Corp.). [Not Literature].

FC/9000 (sold by InRange Technologies). [Not Literature].

Hewlett-Packard NetMetrix Enterprise Manager 4.7 (sold by Hewlett-Packard since at least 1997). [Not Literature].

MeterWare (sold by Technically Elite and/or Hfn since at least 1996). [Not Literature].

*ACD82024 (sold by Advanced Communication Devices since at least 1997). [Not Literature].*

*Switched Networks: Meeting the Management Challenge—A Technology Brief on SMON, A Lannet Switch Monitoring Management Application* (1998), available at http://www.cedpa.k-12.org/databus-issues/v38n3/v38n3-inset.pdf.

Ipsilon Networks, IP Switching: The Intelligence of Routing, the Performance of Switching, An Ipsilon Networks White Paper, (Feb. 1996).

RMON, Catalyst Workgroup Switch, Cisco Systems White Paper, (Dec. 21, 1994), available at http://www.cisco.com/warp/public/614/4.html.

Switched Networks, Meeting the Challenge; A Technology Brief on SMON, The Lannet Switch Monitoring Management Application, Prepared for CEDPA (Mar. 1998), available at http://www.cedpa-k12.org/databus-issues/v38n3/v38n3-insert.pdf.

A. Khan, Design and Implementation of a Software Bridge with Packet Filtering and Statistics Collection Functions, International Journal of Network MGMT., 1997, at 251. [Literature Not Available].

Adtech, Inc. ATM Generator/Analyzer Advertisement, IEEE Network, May 1995.

Alex Gillespie, Management of ATM Port Relay Systems, IEEE Telecommunications Conference Nov. 1995, at 140. [Literature Not Available].

Alfred Weaver & James McNabb, A Real Time Monitor for Token Ring Networks, IEEE MILCOM '89, 1989, at 794.

Bob Wallace, Switches Process Data at Ports for Faster Throughput, Infoworld, Mar. 20, 1995, at 48. [Literature Not Available].

Chang-Hoi Koo, An Evaluation of Output Strategy with Separated Buffer in ATM Switching (Quality Service Lines), SPIE, 1997. at 524. [Literature Not Available].

Chung-Sheng Li et al, A Hybrid Multilevel Control Scheme for Supporting Mixed Traffic in Broadband Networks, IEEE Journal on Selected Areas in Communications, Feb. 1996, at 306.

Eduaardo Magana et al. PROMIS: A Reliable Real-Time Network Management Tool for Wide Area Networks, IEEE 24th Euromicro Conference, Aug. 1998, at 581.

Elwin Steizer & Timothy Gonsalves, Embedding RMON in Large LAN Switches, IEEE Network, Jan./Feb. 1999, at 63.

German Goldszmidt et al., Delegated Agents for Network Management, IEEE Communications Magazine, Mar. 1998, at 66.

Gigabit Ethernet Switch LANBlazer ™7000, ODS Networks, 1998.

Gilbert, Held, Data Communication Components (1979). [Literature Not Available].

Guru Parulkar et al., An Architecture for Monitoring, Visulation, and Control of Gigabit Networks, IEEE Network, Sep./Oct. 1997, at 34. [Literature Not Available].

Heikki Julkenen and C. Edward Chow, Enhance Network Security With Dynamic Packet Filter, IEEE, Apr. 1998, at 268.

Heikki Julkunen and C. Chow, Enhance Network Security With Dynamic Packet Filter (1997).

Hiromi Notani et al., A 622MBS/S 32x8 Scalable ATM Switch Chip Set with On-Chip Searchable Address Queue, 1997 IEE International Solid-State Circuits Conference, 1997, at 150.

Hiroshi Inai & Jiro Yamakita, An Address-Based Queue Mechanism for Shared Buffer ATM Switches with Multicast Function, IEICE Transactions on Communications, Jan. 1998, at 104.

Hiroyuki Yamada et al., 20.8 Gb/s GaAs LSI's Self-Routing Switch for ATM Switching Systems, IEEE Journal of Solid-State Circuits, Jan. 1997, at 31.

Intae Ryoo et al. A Real-Time Integrated Traffic Management Scheme in ATM Networks: Design and Simulation, IEEE, 1996, at 1271.

J. Carlos Calderon et al., A Chip-Set Enabling B-ISDN ATM UNI Transmission Convergence (TC) AAL ¾ Layers, and ATM Layer Function, IEEE International Solid-State Circuits Conference, 1996, at 116.

Jim Duffy, Axon Unveils RMON Probe for Shared-Media Switched Nets, Network World, Apr. 20, 1995, at 22. [Literature Not Available].

Jodi Cohen, LANNET Extends RMON to Watch Over Switches, Network World, Jun. 5, 1995, at 10. [Literature Not Available].

Jodi Cohen, Madge Stacks Up New Ethernet Switches Against Competition, Network World, Jun. 1996 at 13. [Literature Not Availabe].

John McConnell, RMON Methodology: Towards Successful Deployment for Distributed Enterprise Management (2d ed. 1997).

John McHenry, et al., An FPGA-Based Coprocessor for ATM Firewalls, FPCCM, 1997, at 30.

Kazunari Irie et al., Large Capacity Multiplex-Port Brouter with SDH Interface for Regional PC Communication Network System and its Performance, Long-Haul, ATM and Multi-Media Networks (D.W. Faulkner & A.L. Harmer eds. IOS Press 1998), at 110.

Kazunari Irie et al., Large Capacity Multiplex-Port Brouter with SDH Interface for Regional PC Communication Network System, IEEE, 1997, at 1602. [Literature Not Available].

Kimberly Calsse, Lucent Deploys Cajun Compus-Line, Computer Reseller News, Oct. 19, 1998, at 28. [Literature Not Available].

Lakshmi Raman, OSI Systems and Network Management, IEEE Communications Magazine, Mar. 1988, at 46.

Lucent Technologies, Cajun Campus Solutions, Oct. 1999.

Lucent Technologies, CajunView™ P550™ Manager, The Tool for Managing Gigabit-Scaled Campus Networks, Oct. 1998.

Lucent Technologies, Inc., SMON: Setting the Standard (Apr. 1998).

Madge Networks, Collage ™750 Backbone ATM Switch, Product Bulletin, Oct. 1998.

Madge Networks: Ethernet Switching in the Visual Stackable Switch: A Technology White Paper (Jun. 1997). [Literature Not Available].

Madge Networks: Madge Lanswitch LSE-108/208/808 Ethernet Workgroup Switches (1996). [Literature Not Available].

Madge Networks: Madge Lanswitch Plus LFE-4004 Fast Ethernet Switch (1997). [Literature Not Available].

Massimiliano Canosa et al., Traffic Accounting Mechanism for Internet Integrated Services, SPIE, Nov. 1998, at 254.

Michael S. Schroeder et al., Autonet: A High Speed, Self-Configuring Local Area Network Point-to-Point Links, IEEE Journal of Selected Areas in Communications, Oct. 1991, at 1318.

Nevil Brownlee, Netramet 4.1 Users' Guide: Release Notes Ver. 4.1(Univ. of Aukland, New Zeland Nov. 1997).

O. Tigli and G.M. Chaudhry, Wrap-Around Type Switch for ATM, Electronics Letters, Mar. 27. 1997 at 567.

Patrick Dryden, Vendors Tout RMON Tools, Computerworld, Apr. 10, 1995, at 59. [Literature Not Available].

Richard Waterman et al., Remote Network Monitoring MIB Extensions for Switched Networks Version 1.0, The Internet Society, Jun. 1999.

Ronald P. Luijten, An OC-12 ATM Switch Adapter Chipset, IEE ATM Workshop, 1998, at 26.

Shirish Deodhar et al., Distributed Analyzer Permits Real-Time Monitoring of Hetergenous Local Area Networks, IEEE, 1989, at 634. [Literature Not Available].

Stephen Kempainen, Designing Fast Ethernet Switches is Easy with Chip Sets and Reference Kits, EDN, Jan. 1, 1998, at 59.

Steven Bellovin & William R. Cheswick, Network Firewalls, IEEE Communications Magazine, Sep. 1994, at 50 [Literature Not Available].

Tsang-Ling Sheu, A Fault-Tolerant Bridging Scheme for Dynamic Load Balancing, IEE CONF. of Local Computer Networks, 1991, at 166.

W.E. Denzel et al., A Flexible Shared-Buffer Switch for ATM at Gb/s rates, Computer Networks and ISDN Systems, Jan. 1995, at 611.

Wen-Tsuen Chen, On the Design of a High-Performance ATM Bridge, 1998 1st IEEE International Conference on ATM, Jun. 1998, at 207.

William Stallings, Packet Filtering in the SNMP Remote Monitor, DR. Jobb's Journal, Nov. 1994, at 70.

William Stallings, SNMP, SNMPV2, The Infrastructure for Network Management, IEEE Communications Magazine, Mar. 1998 at 37. [Literature Not Available].

William Stallings, SNMP, SNMPV2, and RMON Practical Network Management (2d ed. 1996).

Fabric OS™ Procedures Guide Version 3.0, Brocade Communications Systems, Incorporated, Publication No. 53-0000128-03, 2001.

Brocade® Zoning User's Guide Version 3.0, Brocade Communications Systems, Incorporated, Publication No. 53-0000135-03, 1999, 2000, 2001.

Fabric OS™ Reference Version 3.0, Brocade Communications Systems, Incorporated, Publication No. 53-0000127-03, 2001.

SilkWorm® 3800 Hardware Reference, Brocade Communications Systems, Incorporated, Publication No. 53-0001576-03, 2001.

Brocade Advanced Performance Monitoring™ User's Guide Version 3.0, Brocade Communications Systems, Incorporated, Publication No. 53-0000138-03, 2001.

Brocade QuickLoop™ User's Guide Version 3.0, Brocade Communications Systems, Incorporated, Publication No. 53-0000129-03, 1999, 2000, 2001.

Brocade SES™ User's Guide Version 3.0, Brocade Communications Systems, Incorporated, Publication No. 53-000133-03, 1999, 2000, 2001.

Brocade ISL Trunking™ User's Guide Version 3.0, Brocade Communications Systems, Incorporated, Publication No. 53-0000136-03, 2001.

Brocade MIB Reference Version 3.0, Brocade Communications Systems, Incorporated, Publication No. 53-0000130-03, 2001.

Brocade Web Tools™ User's Guide Version 3.0, Brocade Communications Systems, Incorporated, Publication No. 53-0000130-03, 2000, 2001.

Brocade Distribute Fabrics™ User's Guide Version 3.0, Brocade Communications Systems, Incorporated, Publication No. 53-0000132.03, 2001.

"A Self-Clocked Fair Queueing Scheme for Broadband Applications" by Golestani S.J., 1994 IEEE pp. 636-646.

Supplementary European Search Report, dated Jul. 3, 2007, prepared by European Patent Office for European Patent Application No. EP 99 96 6654, 3 pages.

* cited by examiner

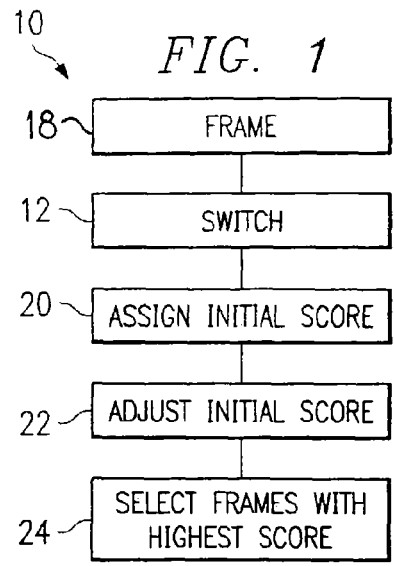
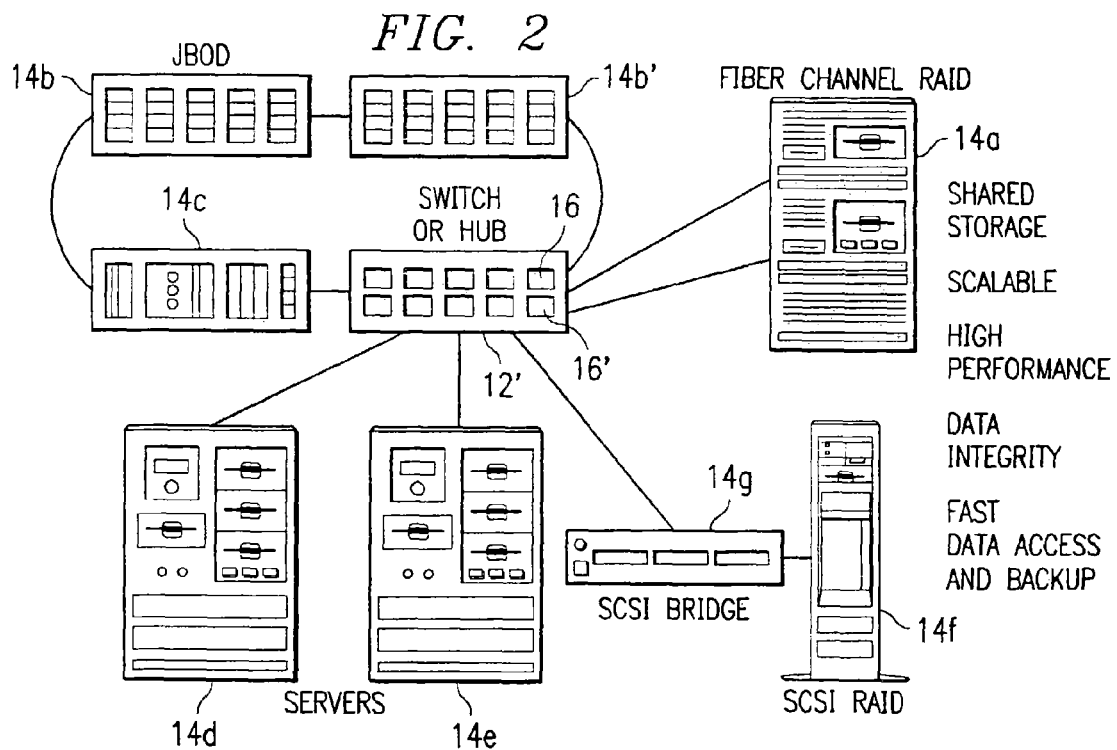

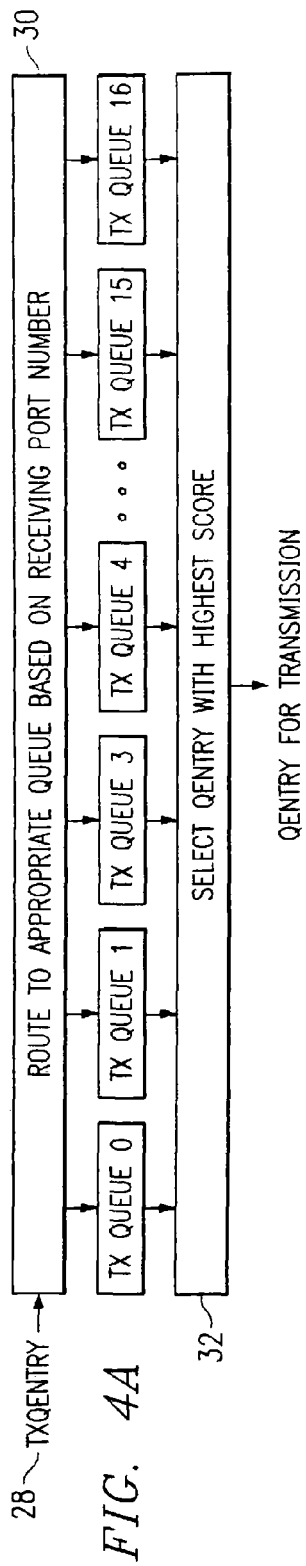

METHOD FOR SCORING QUEUED FRAMES FOR SELECTIVE TRANSMISSION THROUGH A SWITCH

RELATED APPLICATIONS

This application is a continuation-in-part of U.S. patent application Ser. No. 09/728,452 filed Nov. 30, 2000 now U.S. Pat. No. 6,608,819, which is a continuation-in-part of U.S. patent application Ser. No. 09/228,678 filed Jan. 12, 1999 (now U.S. Pat. No. 6,233,236), both of which are incorporated herein by reference.

BACKGROUND OF THE INVENTION

1. Field of the Invention

This invention pertains generally to improvements in methods for sequencing data through a routing device. More particularly, this invention pertains to a method for scoring queued frames for selective transmission through a switch. This invention is particularly, but not exclusively, useful for selectively transmitting frames through a fibre channel switch.

2. Relevant Background

Computer performance during the past decade has increased significantly, if not exponentially, in part driven by the information explosion. Consequently, demand for high-performance communications for server-to-storage and server-to-server networking also has increased. Performance improvements in hardware entities, including storage, processors, and workstations, along with the move to distributed architectures such as client/server, have increased the demand for data-intensive and high-speed networking applications. The interconnections between and among these systems, and their input/output devices, require enhanced levels of performance in reliability, speed, and distance.

Simultaneously, demands for more robust, highly available, disaster-tolerant computing resources, with ever-increasing speed and memory capabilities, continues unabated. To satisfy such demands, the computer industry has worked to overcome performance problems often attributable to conventional I/0 ("input/output devices") subsystems. Mainframes, supercomputers, mass storage systems, workstations and very high-resolution display subsystems frequently are connected to facilitate file and print sharing. Because of the demand for increased speed across such systems, networks and channels conventionally used for connections introduce communication clogging, especially if data is in large file format typical of graphically based applications.

Efforts to satisfy an enhanced performance demands have been directed to providing storage interconnect solutions that address performance and reliability requirements of modern storage systems. At least three technologies are directed to solving those problems SCSI ("Small Computer Systems Interface"); SSA ("Serial Storage Architecture"), a technology advanced primarily by IBM; and Fibre Channel, a high performance interconnect technology.

Two prevalent types; of data communication connections exist between processors, and between a processor and peripherals. A "channel" provides direct or switched point-to-point connection communicating devices. The channels primary task is to transport data at the highest possible data rate with the least amount o delay. Channels typically perform simple error correction in hardware. A "network", by contrast, is an aggregation of distributed nodes. A "node" as used in this document is either an individual computer or similar machine in a network (workstations, mass storage units, etc.) with a protocol that supports interaction among the nodes. Typically, each node must be capable of recognizing error conditions on the network and must provide the error management required to recover from the error conditions.

SCSI is an "intelligent" and parallel I/O bus on which various peripheral devices and controllers can exchange information. Although designed approximately 15 years ago, SCSI remains in use. The first SCSI standard, now known as SCSI-1, was adopted in 1986 and originally designed to accommodate up to eight devices at speeds of 5 MB/sec. SCSI standards and technology have been refined and extended frequently, providing ever faster data: transfer rates up to 40 MB/sec. SCSI performance has doubled approximately every five years since the original standard was released, and the number of devices permitted on a single bus has been increased to 16. In addition, backward compatibility has been enhanced, enabling newer devices to coexist on a bus with older devices. However, significant problems associated with SCSI remain, including, for example, limitations caused by bus speed, bus length, reliability, cost, and device count. In connection with bus length, originally limited to six meters, newer standards requiring even faster transfer rates and higher device populations now place more stringent limitations on bus length that are only partially cured by expensive differential cabling or extenders.

Accordingly, industry designers now seek to solve the limitations inherent in SCSI by employing serial device interfaces. Featuring data transfer rates as high as 200 MB/sec, serial interfaces use point-to-point interconnections rather than busses. Serial designs also decrease cable complexity, simplify electrical requirements, and increase reliability. Two solutions have been considered, Serial Storage Architecture and what has become known as Fibre Channel technology, including the Fibre Channel Arbitrated Loop ("FC-AL").

Serial Storage Architecture is a high-speed serial interface designed to connect data storage devices, subsystem, servers and workstations. SSA was developed and is promoted as an industry standard by IBM; formal standardization processes began in 1992. Currently, SSA is undergoing approval processes as an ANSI standard. Although the basic transfer rate through an SSA port is only 20 MB/sec, SSA is dual ported and full-duplex, resulting in a maximum aggregate transfer speed of up to 80 MB/sec. SSA connections are carried over thin, shielded, four-wire (two differential pairs) cables, which are less expensive and more flexible than the typical 50- and 68-conductor SCSI cables. Currently, IBM is the only major disk drive manufacturer shipping SSA drives; there has been little industry-wide support for SSA. That is not true of Fibre Channel, which has achieved wide industry support.

Fibre Channel ("F/C") is an industry-standard, high-speed serial data transfer interface used to connect systems and storage in point-to-point or switched topologies. FC-AL technology, developed with storage connectivity in mind, is a recent enhancement that also supports copper media and loops containing up to 126 devices, or nodes. Briefly, fibre channel is a switched protocol that allows concurrent communication among workstations, super computers and various peripherals. The total network bandwidth provided by fibre channel may be on the order of a terabit per second. Fibre channel is capable of transmitting frames along lines or lanes at rates exceeding 1 gigabit per second in at least two directions simultaneously. F/C technology also is able to transport commands and data according to existing protocols such a Internet protocol ("IP"), high performance parallel interface ("HIPPI"), intelligent peripheral interface ("IPI"), and, as indicated using SCSI, over and across both optical fiber and copper cable.

The fibre channel maybe considered a channel-network hybrid. An F/C system contains sufficient network features to provide connectivity, distance and protocol multiplexing, and enough channel features to retain simplicity, repeatable performance and reliable delivery. Fibre channel allows for an active, intelligent interconnection scheme, known as a "fabric", and fibre channel switches to connect devices. The F/C fabric includes a plurality of fabric-ports (F_ports) that provide for interconnection and frame transfer between plurality of node-ports (N_ports) attached to associated devices that may include workstations, super computers and/or peripherals. A fabric has the capability of routing frames based on information contained within the frames. The N_port transmits and receives data to and from the fabric.

Transmission is isolated from the control protocol so that different topologies (e.g., point-to-point links, rings, multi-drop buses, and crosspoint switches) can be implemented. Fibre Channel, a highly reliable, gigabit interconnect technology allows concurrent communications among workstations, mainframes, servers, data storage systems, and other peripherals. F/C technology provides interconnect systems for multiple topologies that can scale to a total system bandwidth on the order of a terabit per second. Fibre Channel delivers a new level of reliability and throughput. Switches, hubs, storage systems, storage devices, and adapters designed for the F/C environment are available now.

Following a lengthy review of existing equipment and standards, the Fibre Charnel standards group realized that it would be useful for channels and networks to share the same fiber. (The terms "fiber' or "fibre" are used synonymously, and include both optical and copper cables.) The Fibre Channel protocol was developed and adopted, and continues to be developed, as the American National Standard for Information Systems ("ANSI"). See Fibre Channel Physical and Signaling Interface, Revision 4.2, American National Standard for Information Systems (ANSI) (1993) for a detailed discussion of the fibre channel standard, which is incorporated by reference into this document.

Current standards for F/C support bandwidth of 133 Mb/sec, 266 Mb/sec, 532 Mb/sec, 1.0625 Gb/sec, and 4 Gb/sec (proposed) at distances of up to ten kilometers. Fibre Channel's current maximum data rate is 100 MB/sec (200 MB/sec full-duplex) after accounting for overhead. In addition to strong channel characteristics, Fibre Channel provides powerful networking capabilities, allowing switches and hubs to interconnect systems and storage into tightly knit clusters. The clusters are capable of providing high levels of performance for file service, database management, or general purpose computing. Because Fibre Channel is able to span up to 10 kilometers between nodes, F/C allows very high-speed movement of data between systems that are greatly separated from one another. The F/C standard defines a layered protocol architecture consisting of five layers, the highest layer defining mappings from other communication protocols onto the F/C fabric.

The network behind the servers link one or more servers to one or more storage systems. Each storage system could be RAID ("Redundant Array of Inexpensive Disks"), tape backup, tape library, CD-ROM library, or JBOD ("Just a Bunch of Disks"). One type of RAID system divides each byte of data into bits and stores each bit on a different disk. If the data consists of 8-bit bytes, there will be 10 disks, one for each of the 8 bits, and two more for an error-correcting code. The error-correcting code makes it possible to reconstruct any single missing bit in any byte. Thus, if one of the disk drives fails completely, only one bit will be missing from each byte, and the contents of the failed disk can be reconstructed completely from the error-correcting code.

Fibre Channel networks have proven robust and resilient, and include at least these features: shared storage among systems; scalable networking; high performance; fast data access and backup. In a Fibre Channel network, legacy storage systems are interfaced using a Fibre Channel to SCSI bridge. Fibre Channel standards include network features that provide required connectivity, distance, and protocol multiplexing. It also supports traditional channel features for simplicity, repeatable performance, and guaranteed delivery.

The demand for speed and volume of transmission has generated a concomitant demand for a capability to sort data to enable a user to identify data and data streams that have higher priority than other data queued in devices for routing data, such as a switch, particularly a fibre channel switch. It would be useful, therefore, to be able to order, or sequence, transmission of data through a fibre channel switch, including frames, based on the content of the frame as well as the source of the frame by assigning a score to data received by a device such as a switch, and to be able to transmit data and frames having the highest score.

Currently, therefore, a previously unaddressed need exists in the industry for new, useful and reliable method for scoring queued frames for selective transmission through a switch, particularly in a Fibre Channel environment. It would be of considerable advantage to provide a method for assigning scores to data frames received by a switch, and to selectively expedite transmission of the frames having the highest score.

SUMMARY OF THE INVENTION

In accordance with the present invention a method for scoring queued frames for selective transmission through a routing device, including a switch, is provided. The invention provides for one or more fibre channel switches. The invention also includes the receipt of data, including frames, by the one or more fibre channel switches at a connection, particularly a receiving port in the fibre channel switch. The switches, particularly fibre channel switches, are equipped with one or more registers. Further, the fibre channel switches include one or more means for programming the registers. The data may be received in any order, in sequence or not in sequence.

On receipt of the data, including one or more frames, the data is evaluated based on the content of the data, and an initial score is assigned to the content of the data, including one or more frames of data. The initial score is assigned to the data using a quality of service value based on the content of the data. At least one way to determine the initial value using a quality of service value based on content of the data is to locate at a specific location, on each of the frames, data that has been chosen for examination or scoring, information that is conveyed to the registers from the means for programming the registers associated with the switch. Means for programming the registers are included in all fibre channel switches, and may include a range of software programmability options. Also included in the means for programming are data templates that may be used to program the registers for specific purposes, and may be used for examining predetermined data, or data selected for high priority transmission through the switch. The data thus selected may be bit-wise ANDed with a data mask to obtain revised data. The revised data may be compared with the predetermined data to determine if a participation match exists. Alternatively, the adjusting step also permits selecting frames for which there is no participation match.

The present invention also includes steps for adjusting the initial score. A variety of alternative score components may be applied to the initial score to determine one or more adjusted scores. For example, at least one embodiment of the present invention includes a step for identifying the connections, or receiving ports, in the switch where frames are received. A bandwidth allocation adjustment may be applied to the initial score, an adjustment derived from the data location among the receiving ports. In addition, the present invention provides for calculating the cumulative time that the data, including frames, remain on queue in transmit switches of the switch before being transmitted to a receiver device in the fibre channel fabric. The invention provides for measuring each millisecond (ms) of data time on queue, but different time intervals may be selected. Generally, the initial score is increased by the bandwidth allocation adjustment and for the time on queue.

The present invention also includes a step by which the adjusted scores may be compared with each other. Frames having the highest adjusted scores are identified, and the data having the highest score is rearranged in a reordered queue based on the adjusted scores. The frames having the highest adjusted scores may then be transmitted through the switches.

The foregoing has outlined broadly the more important features of the invention to better understand the detailed description that follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. In addition, the phraseology and terminology, employed in this disclosure are for purpose of description, and should not be regarded as limiting.

At least one advantage of the present invention is that it enhances the availability of the delivery of data frames having higher priority than other frames.

Another advantage o the present invention is that it provides a method for scoring queued frames in a switch for selective transmission through the switch using programmable elements of fibre channel switches already known in the industry.

The present invention also will permit flexibility in selecting among alternative score components to assign scores to the frames received by a fibre channel switch.

Yet another advantage of the present invention is a method for selectively transmitting frames across a fibre channel fabric that is easy to use and to practice, and is cost effective.

These advantages, and other objects and features, of such a method for scoring queued frames for selective transmission through a routing device, including a switch, will become apparent to those skilled in the art when read in conjunction with the accompanying following description, drawing figures, and appended claims.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

BRIEF DESCRIPTION OF THE DRAWING

The novel features of this invention, and the invention itself, both as to structure and operation, are best understood from the accompanying drawing, considered in connection with the accompanying description of the drawing, in which similar reference characters refer to similar parts, and in which:

FIG. 1 is a schematic block diagram showing the steps in the method for scoring queued frames for selective transmission through a switch;

FIG. 2 is a perspective view showing one of many ways a number of devices, including a Fibre Channel switch, may be interconnected in a Fibre Channel network;

FIG. 3 is schematic representation of a variable-length frame communicated through a fiber optic switch as contemplated by the Fibre Channel industry standard;

FIG. 4 is a schematic block flow diagram showing one way a quality of service value in accordance with the present invention may be accomplished.

DESCRIPTION OF THE PREFERRED EMBODIMENTS

Figure 5:
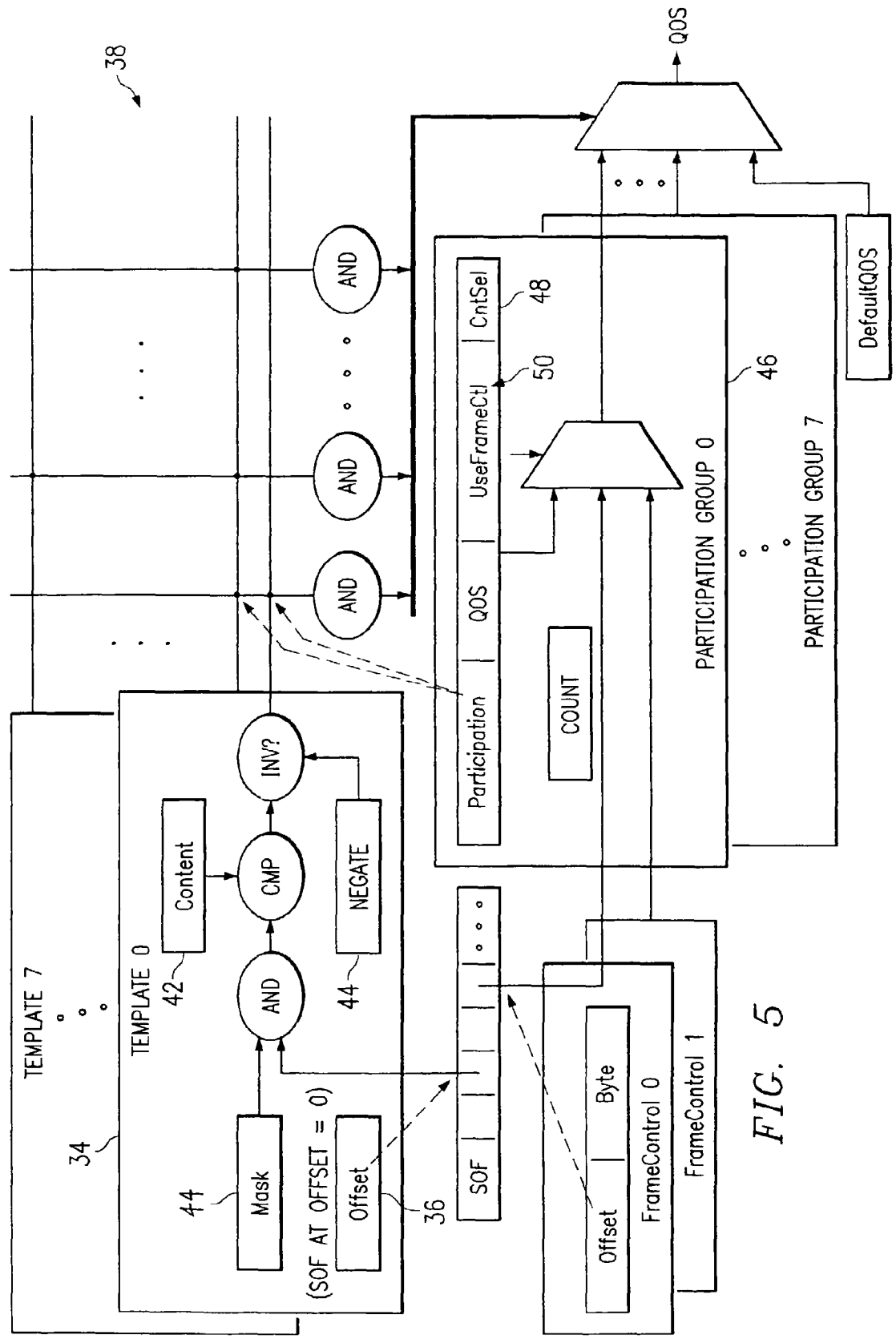
FIG. 5 is schematic block diagram showing one way the method of the present invention may assign a score.

Briefly, the present invention provides a method for scoring queued frames for selective transmission through a switch, particularly a fibre channel switch. As used in this document, the term "scoring" describes the objective of the present invention, namely to assign a score to selected data, including data on a frame, and to select scores having the highest value for priority transmission across devices, including a switch, in a fibre channel fabric. The terms "queued" or "queue" refers to one or more data structures from which items are removed, but for application of the present invention, in the same order in which they were entered. A "frame," as used in this document, includes a presumed configuration of an aggregation of data bits as exemplified in FIG. 3.

As shown in FIG. 1, the invention generally includes providing one or more switches 12, particularly a fibre channel switch 12' in a fibre channel fabric generally shown in FIG. 2; receiving data, including frames 18, as exemplified in FIG. 3, at connections that include ports 16 in switches 12 as described in this document; assigning an initial score 20 to the content of the one or more frames 18; adjusting the initial score 22, as shown in FIG. 1, with one or more alternative score components to determine one or more adjusted scores; comparing the adjusted scores; selecting frames having the highest adjusted scores 24; and transmitting through fibre channel switches 12' frames 18 having the highest adjusted scores.

The present invention, therefore, is useful for enhancing delivery of data frames having higher priority than other frames. The present invention also is useful for scoring queued frames in a switch, particularly a fibre channel switch, for selective transmission through the switch using programmable elements of fibre channel switches already known in the industry. Flexibility in selecting among alternative score components also is included in the present invention.

Referring first to FIG. 1, a schematic and block diagram is shown illustrating in general the method for scoring queued frames for selective transmission through a switch, and is generally designated 10. As shown, the method for scoring queued frames for selective transmission through a switch 10 includes providing one or more fibre channel switches 12 as shown best in FIG. 2. At least one example of a switch 12 in which the present invention may successfully operate is a fibre channel switch employing distributed source and destination queuing for interconnecting a plurality of devices 14a-f, which may also include workstations, supercomputers, and other peripherals, through their associated node ports. Fibre channel switch 12' provides a fabric having a shared memory coupled to a plurality of fabric ports 16 through a bit-slicing memory controller (not shown) over which memory addresses, frame data and communications commands are transmitted. More particularly, at least one example of a fibre channel switch in which the present invention may successfully operate is described and shown in U.S. Pat. No. 5,894,481 issued on Apr. 13, 1999 to Book, a patent that is incorporated by reference into this document.

As shown by cross-reference between FIGS. 1 and 3, the present invention also includes the receipt of data, including one or more frames 18, by one or more fibre channel switches 12' at a connection, particularly a receiving port 16' in fibre channel switch 12'. Fibre channel switch 12' is equipped with one or more registers (not shown). Although not shown in the accompanying drawing figures, the term "register" or "registers" as used in this document includes at least one or more row of electronic circuits that can switch back and forth between two states (0 and 1), will remain in either state until changed, and are used to store one or more groups of binary digits while a CPU is processing them. Further, as known by those skilled in the art, fibre channel switches 12' include one or more means for programming the registers.

As shown in FIG. 3, frames 18 may be received in any order, in sequence or not in sequence. On receipt of the one or more frames, the data on the frames is evaluated based on the content of the data, and an initial score is assigned to the content of the one or more frames 18. More particularly, as shown in FIG. 4, the initial score is assigned to data on frame 18 using a quality of service value 24 based on the content of the data. At least one way to determine the initial value using a quality of service value based on content is to locate, at a specific location on each frame 18, data 26, as exemplified in FIG. 3, that has been chosen for examination. Quality of service value 24 is communicated to the registers from the means for programming (not shown) included in the fibre channel switch 12'. The means for programming may include software. Included in the means for programming are data templates that maybe used to program the registers and used for examining the predetermined data 26, or data 26 selected for high priority transmission through switch 12'. Data 26 thus selected may be bit-wise ANDed with a data mask to obtain revised data. The revised data may be compared with the predetermined data to determine if a participation match exists. Alternatively, the adjusting step also permits selecting frames 18 for which there is no participation match.

As shown best in FIG. 4, which shows at least one of a number of ways the present invention may be practiced, each received frame 12 may be presumed to have a quality of service 24 ("QOS") level assigned to it by a receiving port. Each fibre channel switch 12' may provide for a number of separate queues 28, one for each of the receiving ports 30 (exemplified schematically in FIG. 4) in a fibre channel switch 12'. Each queue 28 may contain one or more queue entries ("Qentries") 32. Qentries 32 also identify the buffer memory location of each frame 18. Each of the queues 28, as shown in FIG. 4, may have a WEIGHT_TIME ("WT") register setting assigned. In addition, the WT register settings may be programmed to provide a greater portion of bandwidth to traffic received from receiving ports 30 with a greater value in the corresponding WT register setting. As used in this document, and as known to those skilled in the art, the term "bandwidth" refers to rate at which a fibre channel system, as exemplified in FIG. 2, may transmit data 26, which in turn is based on the range of frequencies that an electronic system can transmit. Each Qentry 32 may be given a bit score, for example an 8 bit score. As provided by the present invention, at least one formulation of the initial score to be assigned is based on the formula Score=QOS+[WT] [TOQ], where the term "TOQ" means time on queue that a Qentry 32 has spent on a queue 28.

As also shown in FIG. 4, at least one algorithm that may be used in connection with the practice of the present invention is:

A Qentry is received from Port_N;

An initial score for the Qentry is computed from the QOS level assigned by receiving port N, such that Score=QOS;

The Qentry is inserted into a Queue N ahead of all other Qentries in Queue N with lesser scores, but behind all other Qentries with greater or equal scores;

Following passage of a selected time period, the scores for every Qentry in Queue N is adjusted by the WT of N; and Prior to selection of a frame for transmission, the scores of the Qentries at the bottom of the Queues are compared with the entry with the greatest score for selected transmission through the switch, as best shown in FIG. 5.

As shown in FIG. 4, at least one example of the determination of the QOS component 24 of the score is shown. As shown, eight (8) templates 34 are programmed to scan data 26 within an incoming frame 18. Each template 34 examines data 26, which may include a word, at a specified location called an "Offset" 36 within incoming frame 18. The data 26 or word is bit-wise ANDed 38 with a mask word ("Mask") 40, and compared with a content word ("Content") 42. As set out in U.S. Pat. No. 6,233,236, incorporated herein by reference, in a particular example, content 42 includes information extracted from the header fields of each packet transmitted. For example, the header fields of each fibre channel frame include destination ID (i.e., a field identifying the port that is the intended recipient of a frame), a source ID (i.e., a field identifying the port to which the receiver belongs), a frame type (i.e., a field identifying the FC-4 frame type). It should be noted that the destination and source ID information referred to herein refers to intra-switch information and is different from the S_ID and D_ID information in an FC-4 frame that refer to actual fabric device addresses. Other types of information or "metadata" (i.e., data that describes the frame) may be included in the header or other designated fields of a frame depending to the frame format requirements of a particular application. If masked word 40 matches content word 42, a template match has occurred for that template 34. Alternatively, if there is no match, the "Negate" bit 44 is set true, which may be useful if a user seeks to search or scan or for no match, which would be useful, for example, when seeking to define a destination value on frame 18.

Also, a number of participation groups, for example eight (8) "Participation Groups" 46 may be programmed to assign a Quality of Service value 24 to each incoming frame 18. Each Participation Group 46 looks for a participation match for each template 34 corresponding to the bits set to >1= in the Participation field 48 (e.g. if Participation=0001011 then a participation match occurs if Templates 3, 1, and 0 all have template matches). When a participation match occurs, the Quality of Service level 24 for incoming frame 18 is either assigned the QOS value 24 associated with that participation group 48 (when UseFrameCtl=0, or to the frame control word from one of the Frame Control word finders when UseFrameCtl=1 or 2). In addition, while not an essential step in assigning an initial value based on QOS 24, at least two (2) frame control word finders 50 may be programmed to extract a 3-bit value from an incoming frame. Each frame control word finder may extract the 3 least significant bits from a byte in incoming frame 18, and Offset 36 and Byte fields may specify the location of the byte.

The present invention also includes one or more steps for adjusting the initial score. A variety of alternative score components may be applied to the initial score to determine one or more adjusted scores. For example, at least one embodiment of the present invention includes an alternative score component for identifying receiving ports (not shown) for frames 18, and applying a bandwidth allocation adjustment derived from the location pf frame 18 among receiving ports 30. In addition, the present invention provides for calculating the cumulative time that data 26, including frame 18, remain on queue 28 in the transmit switches (not shown) of switch 12' before being transmitted to a receiver device in the fibre channel fabric as suggested by FIG. 2. The invention provides for measuring each millisecond (ms) of time data 26 is on queue 28, but different time intervals may be selected. Generally, the initial score is increased by the bandwidth allocation adjustment and for the time on queue.

The present invention also provides for comparing adjusted scores with each other. As best shown in FIG. 5, frames 18 having the highest adjusted scores are identified, rearranged in a reordered queue based on the adjusted scores, and frames 18 having the highest adjusted scores may then be transmitted through switches 12.

While the method for scoring queued frames for selective transmission through a switch as shown in drawing FIGS. 1 through 5 is one embodiment of the present invention, it is indeed but one embodiment of the invention, is not intended to be exclusive, and is not a limitation of the present invention. While the particular method for scoring queued frames for selective transmission through a switch as shown and disclosed in detail herein is fully capable of obtaining the objects and providing the advantages stated, this disclosure is merely illustrative of the presently preferred embodiments of the invention, and no limitations are intended in connection with the details of construction, design or composition other than as provided and described in the appended claims.

We claim:

1. A method for operating a switch in a communication system according to a quality of service (QOS) metric, the method comprising:
   receiving a data frame containing content;
   comparing the content with a template;
   determining whether at least a portion of the content of the data frame matches the template;
   assigning a QOS score to the data frame based on the determination; and
   transmitting the data frame into a queue entry, wherein the queue entry is associated with a priority relative to other queue entries.

2. The method of claim 1 further comprising: providing a plurality of template registers; and storing a template in each template register, wherein each template is associated with a particular QOS level.

3. The method of claim 1 wherein the QOS score is based upon an FC-4 type of the data frame.

4. The method of claim 1 wherein the QOS score is based upon an FC-4 type specific operation of the data frame.

5. The method of claim 1 wherein said assigning a QOS score to the data frame includes: establishing an initial score for the data based on the content of the data; and
   adjusting the initial scores with one or more alternative score components to determine one or more adjusted scores.

6. A method for assigning a quality of service (QOS) level to frames for selective transmission through a switch, comprising:
   for each frame:
      receiving the frame;
      evaluating a content of the frame;
      assigning a QOS score to the frame; identifying a receiving port for the frame;
   selecting a frame having a highest QOS score; and
   transmitting said selected frame through the switch.

7. The method of claim 6 wherein receiving the frame comprises receiving the frames in any order.

8. The method of claim 7 wherein evaluating a content of said frame includes assigning an initial score to each frame using at least one quality of service value.

9. The method of claim 6 further comprising:
   providing a plurality of template registers; and
   storing a template in each template register, wherein each template is associated with a particular QOS score.

10. The method of claim 9 wherein the step of evaluating the content of the frame comprises comparing the content to each template to determine a match.

11. The method of claim 10 wherein the QOS score is based upon an FC-4 type of the data frame.

12. The method of claim 10 wherein the QOS score is based upon an FC-4 type specific operation of the data frame.

13. A fibre channel switch, comprising:
   a plurality of input/output (I/O) ports;
   a switching element programmably coupling a first of the I/O ports with a second of the I/O ports;
   a first register coupled to the first I/O port and sized to hold at least one metadata field from data in the first I/O port;
   a second register configured to hold a template;
   a comparator coupled to the first and second registers to determine when the metadata held in the first register matches the template held in the second register; and
   means for associating a quality of service value with the frame based upon the metadata matching the template held in the second register.

14. The switch of claim 13 wherein the at least one metadata field is associated with a port ID of the second I/O port.

15. The switch of claim 13 wherein the at least one metadata field is associated with an FC-4 frame type identifier.

16. The switch of claim 13 wherein the at least one metadata field corresponds to a destination port ID.

17. The switch of claim 13 further comprising a timer coupled to time how long each data frame is held in the I/O port.

18. The switch of claim 13 further comprising an application programming interface coupled to the means for associating a quality of service level to supply the quality of service value to external application software.

19. A communication system, comprising:
   a plurality of network devices, each device having a node for communicating with external devices;
   a switch having a plurality of input/output (I/O) ports;
   a communication path coupling each of the plurality of nodes to one of the I/O ports of the switch;
   a switching element within the switch operable to programmably couple a selected source I/O port with a selected destination I/O port;
   a first register coupled to the selected source I/O port and sized to hold at least one metadata field from data in the selected source I/O port;
   a second register configured to hold a template;
   a comparator coupled to the first and second registers to determine when the metadata held in the first register matches the template held in the second register; and
   means for associating a quality of service value with the frame based upon the metadata matching the template held in the second register.

20. The system of claim 19 wherein the first and second registers, the counter, and the comparator are located within the selected source I/O port.

21. The system of claim 19 wherein the first and second registers, the counter, and the comparator are located within the selected destination I/O port.

22. The system of claim 19 wherein the at least one metadata field is associated with a port ID of the selected destination I/O port.

23. The system of claim 19 wherein the at least one metadata field is an FC-4 frame type identifier.

* * * * *

UNITED STATES PATENT AND TRADEMARK OFFICE
CERTIFICATE OF CORRECTION

PATENT NO. : 7,382,736 B2
APPLICATION NO. : 10/613627
DATED : June 3, 2008
INVENTOR(S) : Mitchem et al.

It is certified that error appears in the above-identified patent and that said Letters Patent is hereby corrected as shown below:

Under item (56) References Cited
    In page 2, left column, Other Publications, line 8 of the patent, delete "Subsidiary" and insert --subsidiary-- therefor.

In page 2, left column, Other Publications, line 16 of the patent, delete "Least" and insert --least-- therefor.

In page 2, left column, Other Publications, line 22 of the patent, delete "1988" and insert --1998-- therefor.

In page 2, right column, Other Publications, line 14 of the patent, delete "Manger" and insert --Manager-- therefor.

In page 2, right column, Other Publications, line 57 of the patent, delete "1997." and insert --1997,-- therefor.

In page 2, right column, Other Publications, line 70 of the patent, delete "Gilbert," and insert --Gilbert-- therefor.

In page 3, left column, Other Publications, line 5 of the patent, delete "With" and insert --with-- therefor.

In page 3, left column, Other Publications, line 31 of the patent, delete "Availabe]." and insert --Available].-- therefor.

In page 3, left column, Other Publications, line 39 of the patent, delete "eds." and insert --eds,-- therefor.

In page 3, left column, Other Publications, line 69 of the patent, delete "27." and insert --27,-- therefor.

In page 3, left column, Other Publications, line 1 of the patent, delete "Visulation" and insert --Visualization-- therefor.

In page 3, left column, Other Publications, line 43 of the patent, delete "Compus-Line" and insert --Campus Line-- therefor.

In page 3, right column, Other Publications, line 9 of the patent, delete "Hetergenous" and insert --Heterogeneous-- therefor.

UNITED STATES PATENT AND TRADEMARK OFFICE
CERTIFICATE OF CORRECTION

| | | |
|---|---|---|
| PATENT NO. | : 7,382,736 B2 | Page 2 of 2 |
| APPLICATION NO. | : 10/613627 | |
| DATED | : June 3, 2008 | |
| INVENTOR(S) | : Mitchem et al. | |

It is certified that error appears in the above-identified patent and that said Letters Patent is hereby corrected as shown below:

CONTINUED FROM PAGE 1

In column 1, line 42 of the patent, delete "I/0" and insert --I/O-- therefor.

In column 3, line 2 of the patent, delete "a" and insert --as-- therefor.

In column 3, line 36 of the patent, delete ""fiber"" and insert --"fiber"-- therefor.

In column 5, line 48 of the patent, delete "o" and insert --of-- therefor.

Signed and Sealed this

Sixteenth Day of December, 2008

JON W. DUDAS
*Director of the United States Patent and Trademark Office*